United States Patent
Friedenberger et al.

(10) Patent No.: US 10,446,877 B2
(45) Date of Patent: Oct. 15, 2019

(54) INSTALLATION FOR PRODUCING BOTH AGM AND WET-CELL BATTERIES FOR PASSENGER-CAR AND COMMERCIAL-VEHICLE BATTERY TYPES

(71) Applicant: SASIT INDUSTRIETECHNIK GMBH, Zwickau (DE)

(72) Inventors: Andre Friedenberger, Fraureuth (DE); Jochen Meier, Hartenstein (DE)

(73) Assignee: SASIT INDUSTRIETECHNIK GMBH, Zwickau (DE)

( * ) Notice: Subject to any disclaimer, the term of this patent is extended or adjusted under 35 U.S.C. 154(b) by 373 days.

(21) Appl. No.: 14/912,871

(22) PCT Filed: Aug. 15, 2014

(86) PCT No.: PCT/DE2014/000410
§ 371 (c)(1),
(2) Date: Feb. 18, 2016

(87) PCT Pub. No.: WO2015/024547
PCT Pub. Date: Feb. 26, 2015

(65) Prior Publication Data
US 2016/0204474 A1    Jul. 14, 2016

(30) Foreign Application Priority Data
Aug. 19, 2013    (DE) .......................... 10 2013 013 605

(51) Int. Cl.
*H01M 10/12*    (2006.01)
*C23C 2/10*     (2006.01)
(Continued)

(52) U.S. Cl.
CPC ............. *H01M 10/128* (2013.01); *C23C 2/10* (2013.01); *H01M 2/28* (2013.01);
(Continued)

(58) Field of Classification Search
CPC ............................ H01M 10/0404; C23C 2/10
See application file for complete search history.

(56) References Cited

U.S. PATENT DOCUMENTS

| | | | |
|---|---|---|---|
| 4,175,725 A | 11/1979 | Cattano | |
| 5,459,922 A * | 10/1995 | Hopwood | H01M 10/0404 29/623.1 |

(Continued)

FOREIGN PATENT DOCUMENTS

| | | |
|---|---|---|
| DE | 102012021784 | 5/2013 |
| WO | 9105625 | 5/1991 |
| WO | 2011020469 | 2/2011 |

OTHER PUBLICATIONS

International Search Report for PCT/DE2014/000410, English translation attached to original, Both completed by the European Patent Office dated Nov. 27, 2014, All together 7 Pages.

*Primary Examiner* — Stephan J Essex
(74) *Attorney, Agent, or Firm* — Brooks Kushman P.C.

(57) ABSTRACT

An installation for producing batteries is disclosed, having a lead bath station with two heatable and mobile lead bath carriages arranged in an assignable manner at the stationary lead melting pot. Both carriages having a pumping-sucking device that serves for the changing of the lead bath. Molten lead is pumped out of the lead pot into an empty carriage. Both the pumping-sucking devices are arranged pivotably about the axis of rotation (B) and the pivot pin that is fixedly arranged on the carriage is arranged such that it can be separately pivoted about the axis of rotation (A), thus, making it possible for the suction tube and a discharge tube to be moved between the carriage and the led pot.

7 Claims, 6 Drawing Sheets

(51) Int. Cl.
*H01M 2/28* (2006.01)
*H01M 10/04* (2006.01)
*H01M 10/14* (2006.01)
*H01M 10/16* (2006.01)

(52) U.S. Cl.
CPC ....... *H01M 10/0404* (2013.01); *H01M 10/14* (2013.01); *H01M 10/16* (2013.01); *H01M 2220/20* (2013.01)

(56) References Cited

U.S. PATENT DOCUMENTS

| | | | |
|---|---|---|---|
| 6,238,445 B1 * | 5/2001 | Farmer | B29C 65/7861 29/623.1 |
| 8,756,798 B2 | 6/2014 | Meier et al. | |
| 2012/0240394 A1 * | 9/2012 | Meier | B23P 21/006 29/787 |
| 2014/0304983 A1 | 10/2014 | Meier et al. | |

* cited by examiner

INSTALLATION FOR PRODUCING BOTH AGM AND WET-CELL BATTERIES FOR PASSENGER-CAR AND COMMERCIAL-VEHICLE BATTERY TYPES

CROSS-REFERENCE TO RELATED APPLICATION

This application is the U.S. national phase of PCT Application No. PCT/DE2014/000410 filed on Aug. 15, 2014, which claims priority to DE Patent Application No. 10 2013 013 605.9 filed on Aug. 19, 2013, the disclosures of which are incorporated in their entirety by reference herein.

The invention relates to an installation for producing both AGM batteries (Absorbed Glass Material) and wet-cell batteries for passenger-car and commercial-vehicle battery types which serves from a centrally arranged rotatably mounted transport apparatus for transporting the clamping cartridges which are fitted with the battery plates to be processed, from the lifting and/or rotating apparatus arranged thereon to the individual processing stations of the installation, and a central control apparatus. The processing stations are the feed station with gripper systems on the transport apparatuses for feeding and discharging the battery plate packs to the clamping cartridges, the heatable tin bath with a fluxing agent wetting apparatus, the lead bath station with heatable lead melting pot, and the boxing station with its gripper systems for removing the battery plate packs from the individually designable clamping cartridges and feeding and boxing thereof in the battery cases.

Installations of this type are required for the efficient production of different car batteries for the passenger-car and commercial-vehicle sector in one installation.

Apparatuses for processing battery plates for subsequently being boxed into the battery cases are already known from the prior art.

For instance, PCT/DE2010/000979 describes an apparatus for fitting and equipping motor vehicle battery housings as a compact installation which has a total of four processing stations (1, 2, 3, 4) which are arranged offset in each case by 90° around an electrically driven elevating/rotary table (5), the processing station 1 serving to feed clamping cartridges 6 which are fitted with tested battery plates and, to this end, having at least one feed belt, lug aligner which can be lowered from above, lug bender which can be lowered from above and a pivoting mechanism.

A further station serves to tin plate the lugs of the battery plates. To this end, it has at least one fluxing apparatus which can be advanced, a stripper, a drying device and a pivoting mechanism.

The processing station 3 serves as lead station and, to this end, has at least one casting bridge ejection apparatus, a heatable lead molding means and a depositing/lifting apparatus. The processing station 4 is the boxing station and, to this end, has at least one pivoting mechanism, at least one gripper gantry which is equipped with at least six grippers, at least two boxing frames, and conveyor belts which are equipped with a rotating apparatus.

One disadvantage of said compact installation lies in the fact that only battery plates of one battery type can be processed and the installation has to be brought to a standstill during changing of the lead bath.

The installation is based on these features of the solution which are described in DE PCT/DE2010/000979. However, on the basis of the different battery types, such as a wet-cell battery, in which the acid is filled in such that it can move freely between the battery plates, and AGM (Absorbed Glass Material), in which the acid between the plates is bound in the AGM, and both are used both for the passenger-car sector and for the truck sector, the problem occurs during production of an installation that firstly different requirements are made of the processing sequences of the battery plates, such as different lead compositions, with or without tin bath, and secondly different battery plate sizes and dimensions of the battery plate packs are to be handled during the treatment processes.

It is an object of the invention to provide an installation, with the aid of which the disadvantages of the prior art can be overcome. The installation is to be distinguished by the fact that the processing and boxing both of AGM battery plate packs and of wet-cell battery plate packs both for the passenger-car sector and for the truck sector and with in each case at least six different type sizes can be realized in one installation.

To this end, the cycle times are additionally to be reduced, and necessary changeover measures of the installation are to be capable of being realized in a time-saving manner and, if possible, as far as possible during the cycle times.

According to the invention, the objects are achieved by way of the features of claim 1, the advantageous embodiments being described in the subclaims.

According to said claim, the installation for producing both AGM and wet-cell batteries for passenger-car and commercial-vehicle battery types first of all consists of a centrally arranged rotatably mounted transport apparatus for transporting the clamping cartridges which are fitted with the battery plates to be processed, with a lifting and/or rotating apparatus to the individual processing stations of the installation, such as the feed station with gripper systems on the transport apparatuses for feeding and discharging the battery plate packs to the clamping cartridges with lug-aligning and lug-bending apparatus, the heatable tin bath with fluxing agent wetting apparatus and drying device, the lead bath station with lead melting pot, and the boxing station with gripper systems for removing the battery plate packs from the individually designable clamping cartridges and feeding and boxing thereof in the battery cases, and a central control apparatus, as are known from DE PCT/DE2010/000979.

According to the invention, two heatable and movable lead bath carriages are arranged such that they can be allocated at the lead bath station at the stationary lead melting pot for hot lead bath changing, of which one of the two carriages contains the second lead bath. A pumping/suction apparatus which serves for lead bath changing is arranged on both carriages. The lead is pumped in the melted hot state from the lead pot into the empty carriage.

Both the pumping/suction apparatus and the pivot axis which is arranged fixedly on the carriage are arranged such that the pumping/suction can be pivoted separately about the rotational axis (B) and about the rotational axis (A).The pumping/suction apparatus is connected by way of the suction pipe and pump outlet pipe arranged thereon via a connecting axis with a lifting apparatus to the fixedly arranged rotational axis of the carriage. The suction pipe can then be lifted from the pot and the pump outlet pipe can be lifted from the carriage simultaneously. The pump with the suction and pump outlet pipe arranged thereon can be rotated both about the rotational axis (A) and about the rotational axis (B) and is positioned into a basic position on the carriage. The position of the carriages may be swapped, with the result that the second carriage with the second lead bath with a special composition is moved up to the pot. By way of lowering of the construction on the lifting apparatus of the fixed pivot axis, the pump outlet pipe is dipped into the pot and the suction pipe is dipped into the second lead bath. Here, the suction pipe which is arranged above the pump is also again positioned with its end in the pot. If required, the pump can also be positioned with its pumping/suction apparatuses horizontally on the connecting axis such that its position can be changed. The pump then sucks or pumps the melted second lead bath out of the second carriage into the lead pot.

The advantage of this solution consists in the fact that the lead bath can always be kept at a constant temperature by way of the exchange of the lead bath troughs completely in the heated state by way of mobile lead bath carriages which can be moved toward and away from the pot, even during pumping out and during the filling operation. A changeover can be performed very quickly, since all the melting processes can be organized in a preparatory manner while operation is running.

In order to comply with the situation where different battery types are to be manufactured, it is necessary that battery plate packs of different dimensions have to be gripped by the gripper system. However, the requirements of boxing the finished battery plate packs in the battery cases of different dimensions also leads to problems if the conventional technology is used. The AGM battery plate packs are more difficult to box in the battery cases than the wet-cell battery plate packs.

In order to solve this problem, the gripper system is equipped according to the invention with a filling mechanism and a positioning mechanism at the same time.

To this end, there is the possibility that the gripper system is equipped with a pneumatic cylinder which serves to grip the battery plate packs and a second pneumatic cylinder which serves to position the finally processed battery plate packs from the gripper fingers into the provided battery cases. A filling ram is arranged on said second pneumatic cylinder at the lower end in such a way that it acts on the battery plate packs between the gripper fingers and positions said plate packs in the battery cases.

The advantage of this solution consists in that, on account of this combination tool, firstly reliable boxing can be realized by way of additional positioning of the battery plate packs and secondly cycle time shortening takes place, since the additional tool parts which are otherwise necessary can be dispensed with as a result of the combination of said method steps in one tool.

In order for it to be possible to react to the different dimensions of the plate packs in an uncomplicated manner, without it being necessary to change the clamping cartridges, the apparatus can change the clamping cartridges to the respective size of the plate pack. This is achieved in a quick and uncomplicated manner by way of the arrangement of an additional dimensioning insert in the clamping cartridge. The dimensioning insert is preferably an exchangeable insert bottom plate which serves to compensate for the height of the battery plate packs to be processed which are of different dimensions. As a result, the required vertical level of the various plate packs can be compensated for quickly and effectively, without it being necessary for the clamping cartridges to be changed.

Since every battery type, whether wet-cell battery or AGM battery, requires a separate processing sequence, the control unit is equipped with the necessary processing sequence programs for the different battery plate types.

A gripper head changing station with gripper head store is advantageously arranged at the boxing station 4, as a result of which the gripper heads, equipped with a quick change closure, can be changed over reliably and quickly to the battery plate pack size.

More than 6 battery sizes of different dimensions of each of the two battery types can be produced by way of an installation designed in this way for producing both AGM and wet-cell batteries for passenger-car and commercial-vehicle battery types. Recourse can be made to the existing technology and it can be retrofitted with the proposed solutions, in order to change over the existing technology to the further battery type production processes. The cycle times for the processing of the battery plate packs up to boxing of the latter in the battery cases are shortened substantially.

It has been possible to reduce the changeover times to a different battery size and/or to a different battery type substantially to the time for the lead bath exchange as a result of the solutions. The installation utilization has been increased immensely and it has been possible to save the costs for additional investments for new installations.

The solution is to be explained in greater detail using one exemplary embodiment.

EXEMPLARY EMBODIMENT

According to FIGS. 1 to 6, an installation for producing both AGM and wet-cell batteries for passenger-car and commercial-vehicle battery types consists of a centrally arranged rotatably mounted transport apparatus for transporting the clamping cartridges which are fitted with the battery plates to be processed, with a lifting and/or rotating apparatus to the individual processing stations of the installation, such as the feed station 1 with its gripper systems on the transport apparatuses for feeding and discharging the battery plate packs to the clamping cartridges with lug-aligning and lug-bending apparatus, the heatable tin bath with fluxing agent wetting apparatus and drying device as processing station 2, the lead bath station with lead melting pot as processing station 3, and the boxing station 4 with its gripper systems 4.1 for removing the battery plate packs 5 from the individually designable clamping cartridges 6 and feeding and boxing thereof in the battery cases 7, and a central control apparatus, as is already known from DE PCT/DE2010/000979 A1.

Figure 1:
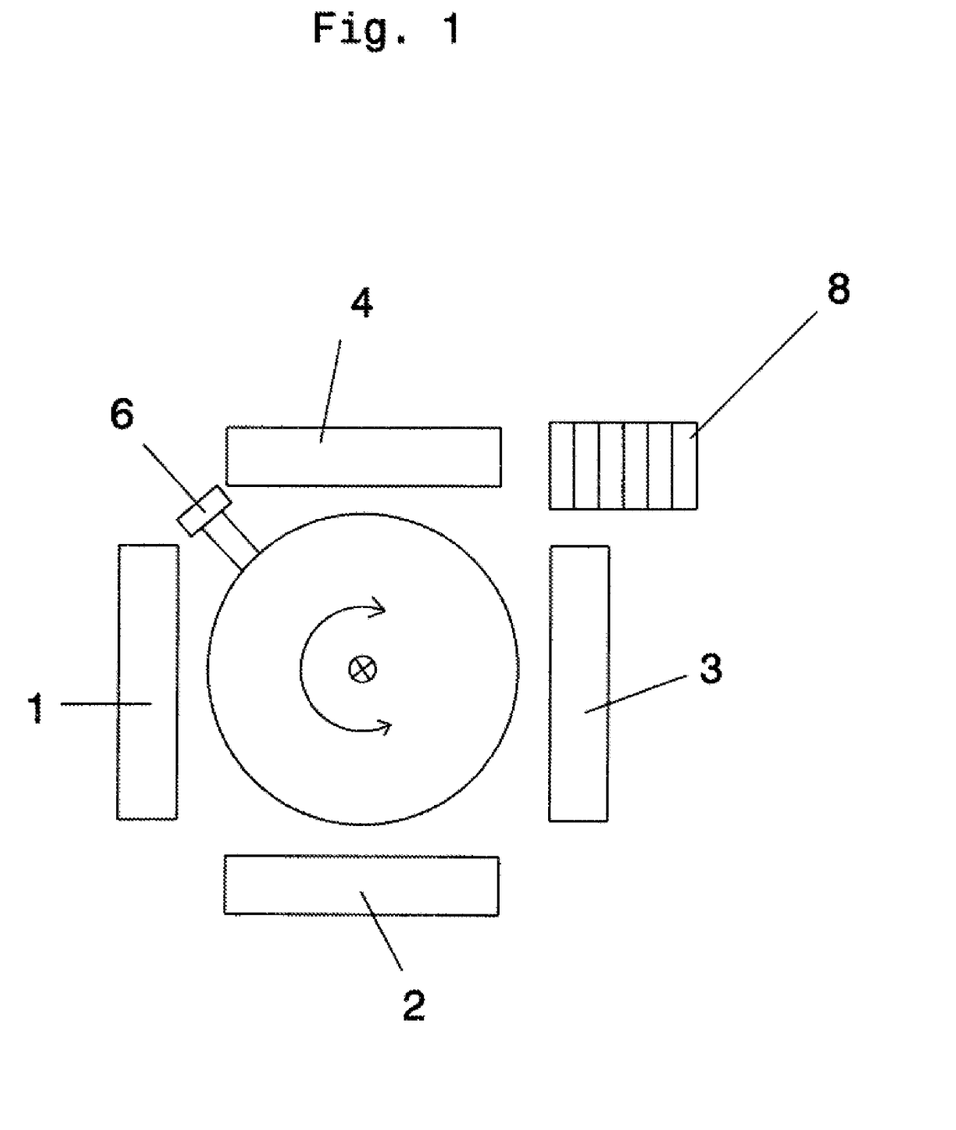
FIG. 1 shows a diagrammatic plan view as an outline illustration of the installation arrangement.
Figure 2:
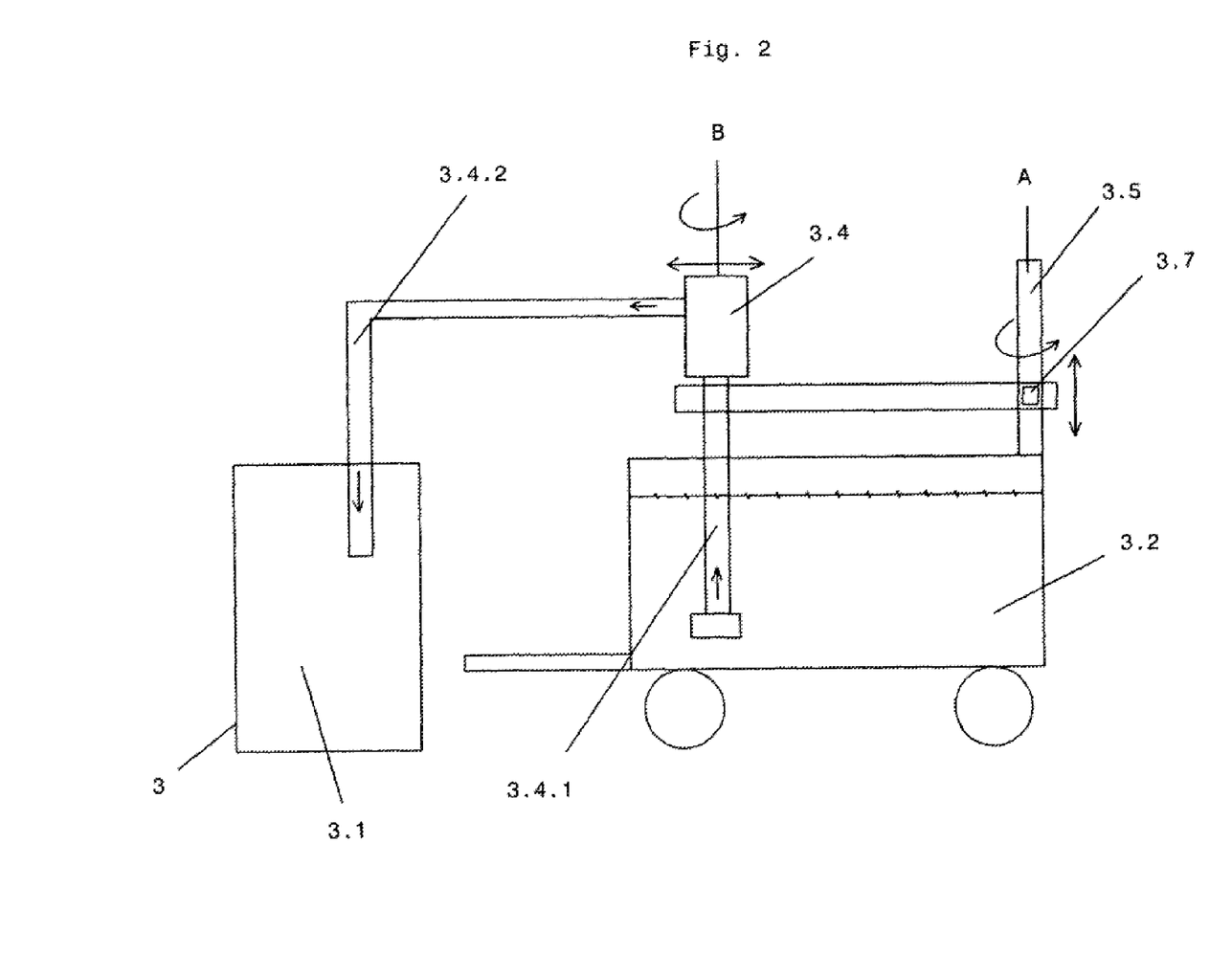
FIG. 2 shows a diagrammatic side view of the lead bath station in the phase of pot filling from the carriage 3.2.
Figure 3:
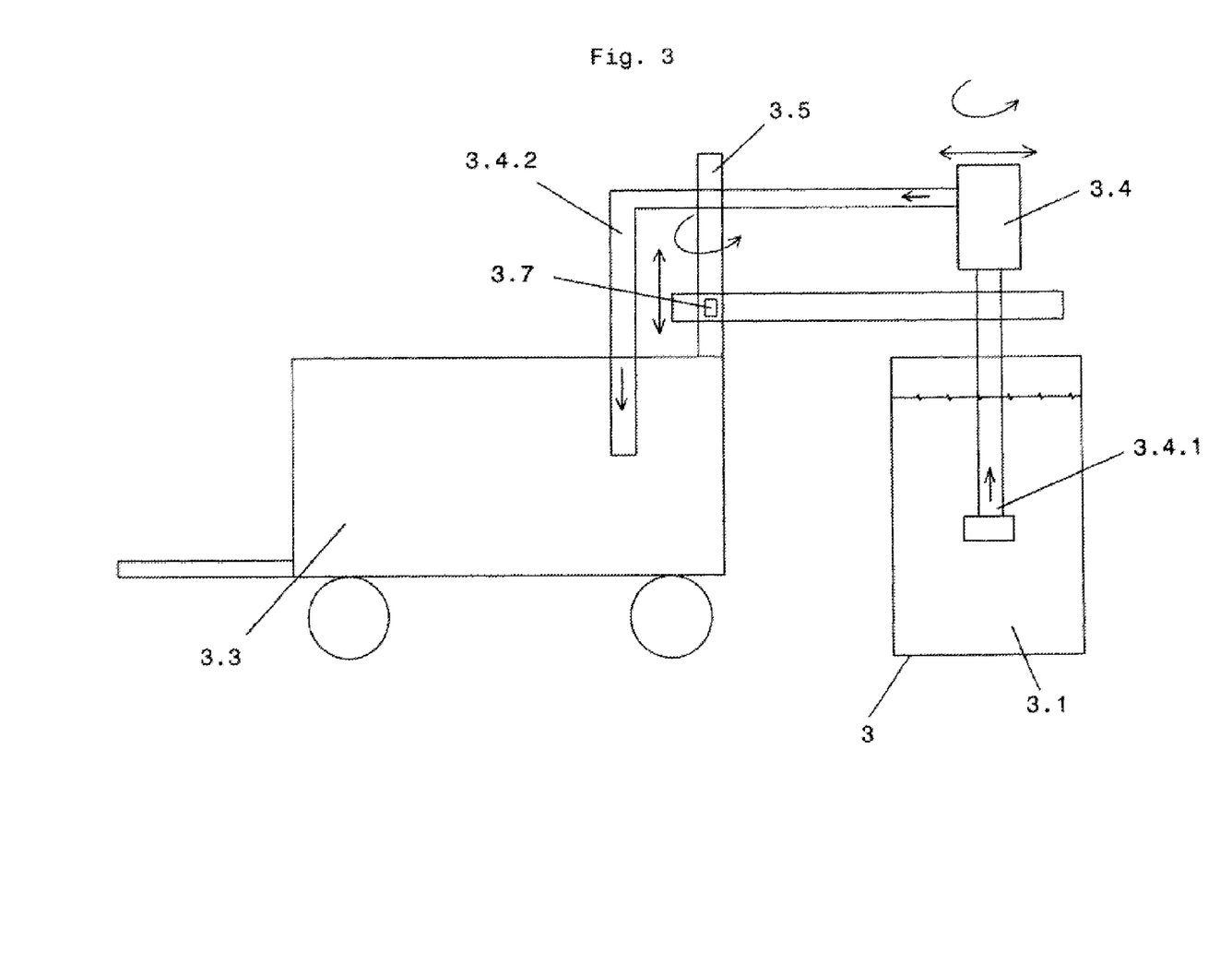
FIG. 3 shows a diagrammatic side view of the lead bath station in the phase of pot emptying with filling of the empty carriage 3.3.

In order to design said installation so as to be ready for use for producing battery sizes of various dimensions and different battery types, with the result that all sizes of the AGM battery types and of the wet-cell battery types for passenger cars and for commercial vehicles can be manufactured, the installation has two heatable and movable lead bath carriages 3.2, 3.3 at the lead bath station 3 at the stationary lead melting pot 3.1 for lead bath changing in the hot melted state, which lead bath carriages 3.2, 3.3 can be assigned to the lead pot. One of the two carriages contains the second lead bath, in each case one pumping/suction apparatus 3.4 with lifting function which serves for lead bath changing being arranged on the two carriages 3.2, 3.3 such that it can be rotated and raised and lowered on a fixed pivot axis 3.5 via a connecting axis 3.6. The pumping/suction apparatus 3.4 is in turn arranged on the connecting axis 3.6 such that it can be displaced in the horizontal direction. Both the pumping/suction apparatus 3.4 and the pivot axis 3.5 which is arranged on the carriage are arranged such that they can be pivoted in each case separately about the rotational axis (B) and about the rotational axis (A), respectively. The pumping/suction apparatus 3.4 is equipped in each case with an upper pump outlet pipe 3.4.2 and a lower suction pipe 3.4.1. As a result, there is the possibility that the full pot can be pumped out into the empty carriage and, after the exchange of carriages, the other lead bath which is present in the melted state can be pumped out of the full carriage into the empty pot.

To this end, the pump outlet pipe and the suction pipe can be positioned correspondingly within the lead bath station. The lead bath station can advantageously be heated and kept at temperature both in the pot and in the carriages, with the result that the use of the lead bath can take place immediately after the pot is filled. Neither the quality of the lead bath nor the quality of the sprue is impaired by the exchange.

Figure 4:
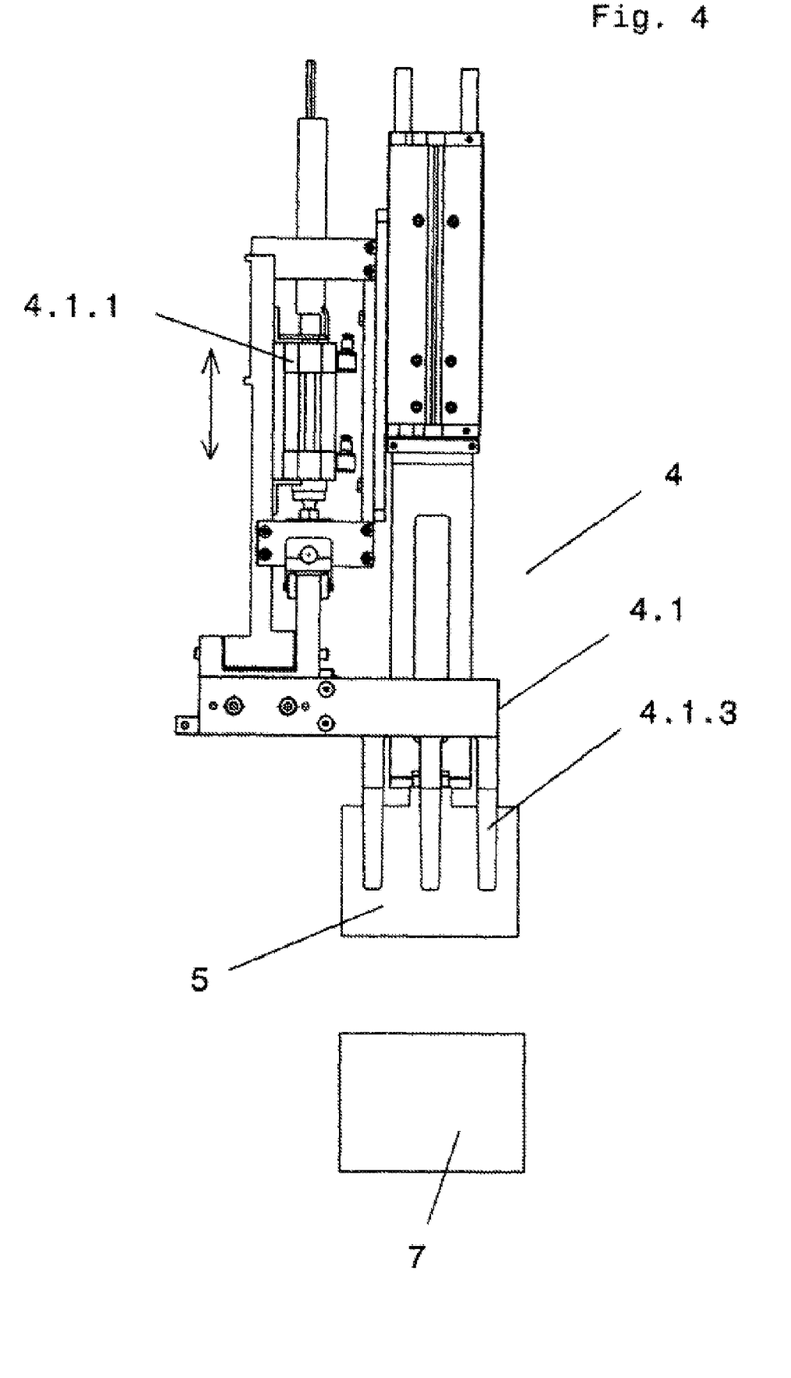
FIG. 4 shows a diagrammatic side view of the gripper system 4.1 with the plate pack between the gripper fingers before the action of the filler.
Figure 5:
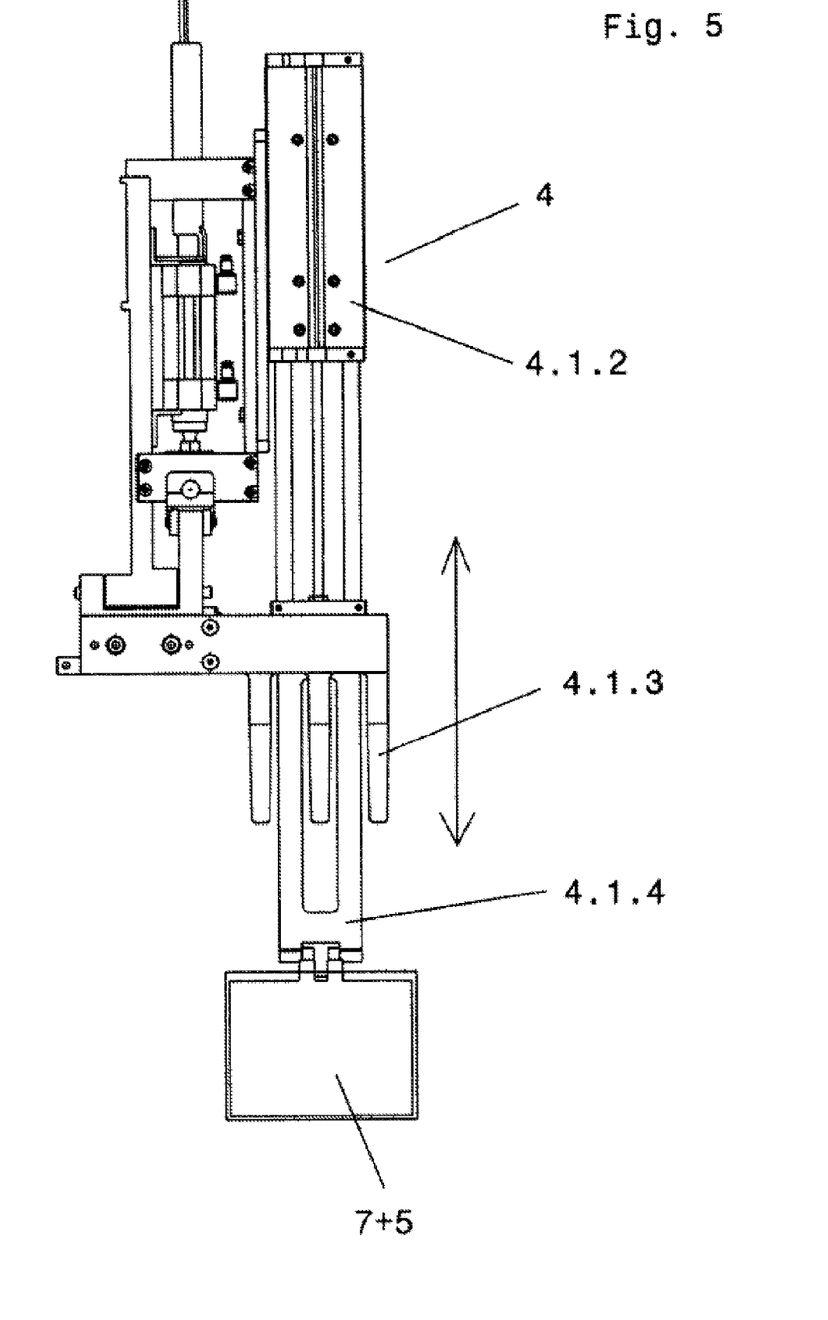
FIG. 5 shows a diagrammatic side view of the gripper system 4.1 with the plate pack in the boxed state within the battery case under the influence of the filler.

In order to satisfy the different requirements during boxing of AGM battery plates which can be compressed with relative difficulty and wet-cell battery plates which can be compressed easily, the gripper system 4.1 at the boxing station 4 is equipped at the same time with a separately actuable filling mechanism.

To this end, the gripper is equipped with a pneumatic cylinder 4.1.1 which serves to grip the battery plate packs 5 and a second pneumatic cylinder 4.1.2 which can be actuated separately and serves to position the finally processed battery plate packs 5 from the gripper fingers 4.1.3 into the battery cases 7. To this end, a filling ram 4.1.4 is firstly arranged on the pneumatic cylinder 4.1.2 in such a way that it acts on the battery plate packs 5 between the gripper fingers 4.1.3, and secondly a spreading wedge 4.1.5 which serves to spread the gripper fingers 4.1.3 is arranged at the lower end of the pneumatic cylinder 4.1.2.

If AGM battery plate packs 5 are being processed and they are received by the gripper fingers 4.1.3 for boxing and are positioned over the battery cases 7, the pneumatic cylinder 4.1.2 with the filling ram 4.1.4 which is arranged at the lower end moves downward, and the cylinder of the spreading wedge 4.1.3 at the same time moves upward, in order to bring about the opening of the gripper fingers 4.1.3. The filling ram 4.1.4 moves downward between the gripper fingers 4.1.3 and presses on the battery plate pack 5 and presses it into the empty battery case 7. This ensures that both wet-cell battery plate packs and AGM battery plate packs can be boxed in a gentle manner in the provided empty battery cases by the same tool of the installation with satisfactory quality and in the necessary cycle time. As a result, valuable cycle times are saved and a changeover of the tool during product change is not required.

Figure 6:
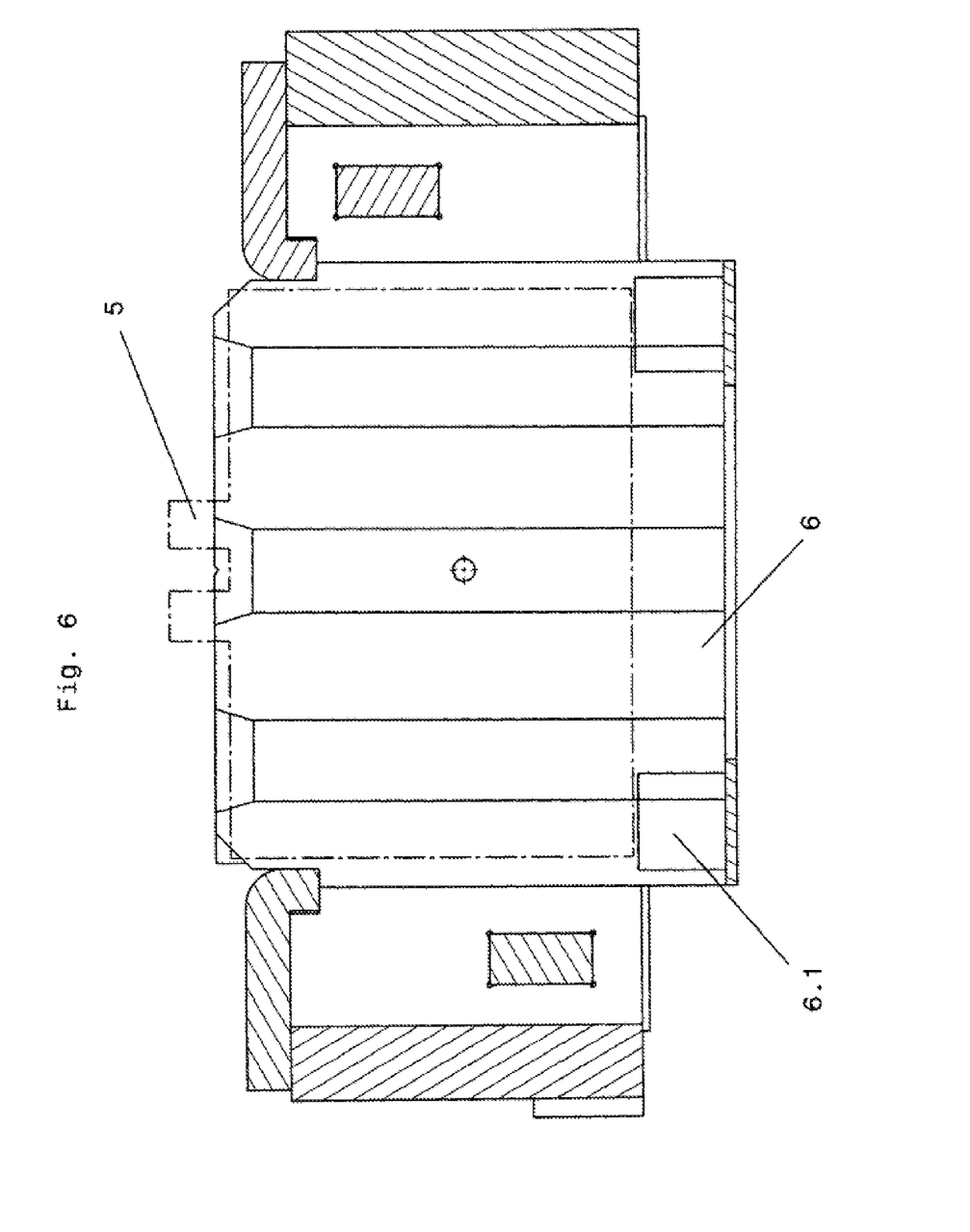
FIG. 6 shows the diagrammatic sectional illustration of a clamping cartridge 6 with bottom insert plate 6.1.

Since, however, the battery plate packs for the various battery types and sizes are of different dimensions, it is necessary to adapt the clamping cartridge 6 to the various sizes. To this end, the clamping cartridge 6 has at least one dimensioning insert. This is configured, for example, as an insert bottom plate 6.1 and serves to compensate for the height of the battery plate packs 5 to be processed of different dimensions. As a result, the changeover of the installation and the equipment with other clamping cartridges during product change are avoided reliably. The costs for size-adapted clamping cartridges which are additionally to be provided are likewise unnecessary.

Should a different gripper insert become necessary for boxing the battery plate packs at the boxing station 4, a gripper head change station with gripper head store 8 is advantageously arranged at the boxing station. As a result, if used with quick change connections, time for the gripper changes once again saved.

In order to realize a quick changeover to the other battery type and/or the other battery size as quickly as possible, the central control unit is advantageously equipped with the processing sequence programs which are necessary for the various battery plate types.

These technical solutions for realizing the manufacture of both AGM and wet-cell batteries for passenger cars and commercial vehicles can be realized in a very inexpensive, uncomplicated manner and in a short time, and lead to an enormous economic advantage in terms of the capacity of the installation. Installations which already exist can be retrofitted inexpensively and with little expenditure of time.

LIST OF DESIGNATIONS

1 Feed station
2 Tin bath station
3 Lead bath station
3.1 Lead melting pot
3.2 Lead bath carriage 1
3.3 Lead bath carriage 2
3.4 Pumping/suction apparatus with pump
3.4.1 Pumping/suction pipe
3.4.2 Pump outlet pipe
3.5 Pivot axis
3.6 Connecting axis
3.7 Lifting apparatus
4 Boxing station
4.1 Gripper system
4.1.1 Pneumatic cylinder for the gripper
4.1.2 Pneumatic cylinder for the filling ram
4.1.3 Gripper fingers
4.1.4 Filling ram
5 Battery plate packs
6 Clamping cartridge
6.1 Dimensioning insert
7 Battery cases
8 Gripper head store at station 4
A Rotational axis of the pivoting bearing
B Rotational axis, pump

The invention claimed is:
1. An installation for producing both AGM and wet-cell batteries for passenger-car and commercial-vehicle battery types, comprising:
   centrally arranged rotatably mounted transport apparatus for transporting a clamping cartridge which is fitted with a battery plate to be processed, with a lifting and/or rotating apparatus to an individual one of a plurality of process stations of the installation, comprising;
   a feed station with gripper systems on a transport apparatus for feeding and discharging a battery plate pack to the clamping cartridges with a lug-aligning and lug-bending apparatus, a heatable tin bath with a fluxing agent wetting apparatus and a drying device, a lead bath station with a stationary lead melting pot, and a boxing station with gripper systems for removing the battery plate packs from the individually designable clamping cartridges and feeding and boxing battery cases, and a central control apparatus, wherein two heatable and movable lead bath carriages are arranged such that they can be allocated at the lead bath station at the stationary lead melting pot for hot lead bath changing, of which one of the two carriages contains a second lead bath, a pumping/suction apparatus with lifting function which serves for lead bath changing being arranged on both carriages, and both the pumping/suction apparatus and a pivot axis which is arranged fixedly on the carriage being arranged such that they can be pivoted in each case separately about a rotational axis (B) and about a rotational axis (A), respectively, and the pumping/suction apparatus being connected in a positionally changeable manner, in that the gripper system is at the same time equipped with a separately actuatable filling mechanism, and in that the clamping cartridge has at least one dimensioning insert in order to receive battery plate packs dimensioned with different sizes and shapes, and in that the control apparatus is equipped with a necessary processing sequence program for handling various battery plate types.

2. The installation for producing both AGM and wet-cell batteries for passenger-car and commercial-vehicle battery types as claimed in claim 1, characterized in that the gripper system is equipped with first a pneumatic cylinder which serves to grip the battery plate packs and a second pneumatic cylinder which can be actuated separately and serves to position the finally processed battery plate packs from a gripper finger into the battery cases, a filling ram being firstly arranged on the first pneumatic cylinder in such a way that it acts on the battery plate packs between the open gripper fingers, and secondly a spreading wedge which serves to spread the gripper fingers being arranged on the second pneumatic cylinder.

3. The installation for producing both AGM and wet-cell batteries for passenger-car and commercial-vehicle battery types as claimed in claim 1, wherein, in order to individually adapt the battery plate packs of different dimensions, the clamping cartridges have an exchangeable insert bottom plate which serves to compensate for height variation of the battery plate packs to be processed which are of different dimensions.

4. The installation for producing both AGM and wet-cell batteries for passenger-car and commercial-vehicle battery types as claimed in claim 1 wherein a gripper head changing station with gripper head store is arranged at the boxing station.

5. The installation for producing both AGM and wet-cell batteries for passenger-car and commercial-vehicle battery types as claimed in claim 2, wherein that, in order to individually adapt the battery plate packs of different dimensions, the clamping cartridges have an exchangeable insert bottom plate which serves to compensate for height variation of the battery plate packs to be processed which are of different dimensions.

6. The installation for producing both AGM and wet-cell batteries for passenger-car and commercial-vehicle battery types as claimed in claim 2 wherein a gripper head changing station with gripper head store is arranged at the boxing station.

7. The installation for producing both AGM and wet-cell batteries for passenger-car and commercial-vehicle battery types as claimed in claim 3 wherein a gripper head changing station with gripper head store is arranged at the boxing station.

* * * * *